Jan. 9, 1962 W. W. MOUNT 3,015,902
FISH TRAP
Filed Jan. 5, 1961

INVENTOR.
WADSWORTH W. MOUNT
BY
ATTORNEY

United States Patent Office 3,015,902
Patented Jan. 9, 1962

3,015,902
FISH TRAP
Wadsworth W. Mount, Warren Township, Somerset
County, N.J. (51 High St., Summit, N.J.)
Filed Jan. 5, 1961, Ser. No. 80,904
8 Claims. (Cl. 43—7)

This invention relates to fish traps or nets and is particularly concerned with means for attracting fish into a moving net.

Stationary nets or fish traps are well known, and drag nets which are towed by boat are also well known, but the fish trap of this invention operates upon a different principle.

The tendency of fish to swim upstream and also to be attracted to an under-water stream by reason of the movement of the water, has in this invention been combined with the principle of chumming.

Ordinarily chumming consists of scattering small pieces of bait on the water and thereby attracting the fish to the area so that they may be caught on hooks and lines, or otherwise, from the boat which is comparatively stationary in order to take advantage of the chumming.

According to this invention, a tubular net, which is preferably conical, is weighted so as to be located at any desired depth where fish are supposed to be located. The boat with which the conical net is associated is moved forward at a comparatively slow rate with the apex end of the cone foremost. A nozzle is centrally located in the cone near the apex and discharges a stream of water at an accelerated rate along the axis of the cone in a backward direction with reference to the movement of the boat. The nozzle is supplied with water containing particles of bait or chum through a hose connected to a suitable pump on the boat. A chopper or meat grinder is preferably located on the boat, as indicated at 23, to furnish a supply of finely divided bait. Any fish not desired for the catch can thus be disposed of through the grinder and save the necessity of special bait.

Figure 1:
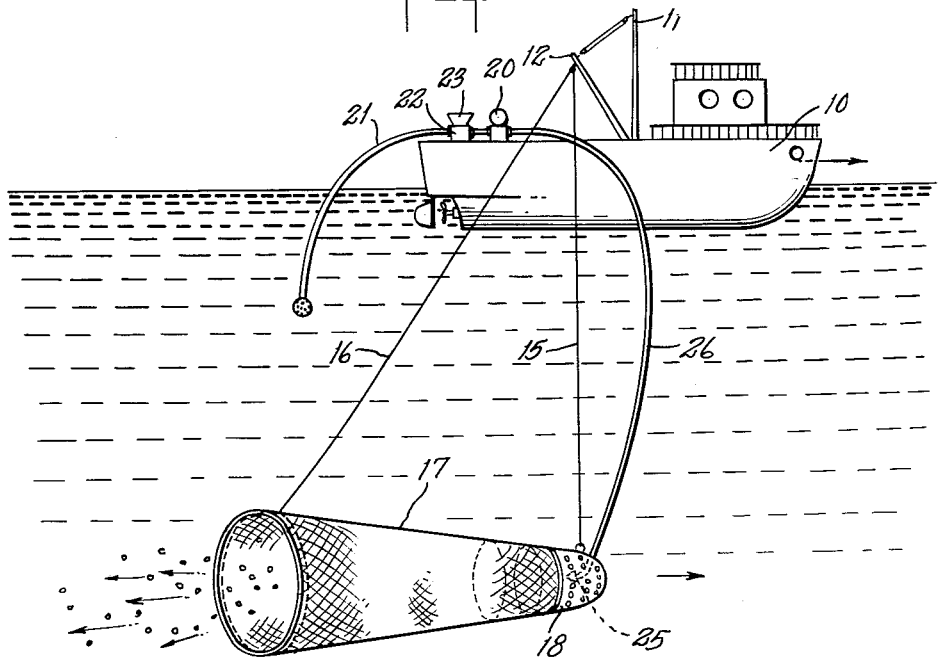
Figure 2:
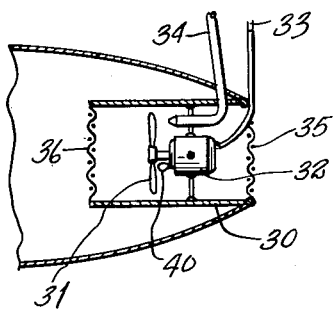

The preferred arrangement and operation of the fish trap will be clearly understood by reference to the drawings, in which:

FIG. 1 is a diagrammatic sketch showing a boat, water line, fish trap and connections; and FIG. 2 is a fragmentary view of a modified arrangement for producing the accelerated stream.

Referring to FIGURE 1, a fishing boat or other vessel 10 having a derrick 11 with a hoisting arm 12 mounted on the boat, carries cables 15 and 16 which are connected to the respective ends of a net or fish trap 17.

The net 17 is conical or frusto-conical in shape. Near the apex end it is open to the water and has a metal or wood frame 18 which keeps the net open at this end. The net is of any usual sein construction and its size and length would depend on the type of fish which are to be caught.

Mounted on the boat is a pump 20 which is supplied with water from an intake 21 through a tank 22 into which finely divided bait or chum is fed through the chopper 23.

A nozzle 25 is suitably supported at the apex end of the conical trap and is arranged to discharge axially toward the large end of the net in a backward direction relative to the movement of the boat. A hose 26 connects the nozzle to pump 20 which is driven by any suitable motor or engine not shown. When the engine is operated and the pump driven, an accelerated stream of water containing fine particles of bait is discharged outwardly from the apex through the larger end of the trap which is flexible but may be kept open by the action of the accelerated stream of water or by other collapsible means.

As the boat moves forward at a slow speed, the accelerated stream containing the bait particles flows outwardly from the trap in a backward direction, and this stream of bait particles may extend a long distance behind the net. The fish are thus attracted not only by the movement of the water but also by smell and taste of the bait particles and have a natural tendency to swim against the accelerated stream and into the trap. When the trap has thus gathered in a quantity of fish, line 16 is hauled in by the derrick 11 so as to close the open end of the trap, following which the entire trap with the fish is hoisted onto the boat.

Referring to FIGURE 2, instead of the jet 25, a cylindrical member 30 is located at the forward end of the trap in which a propeller 31 is mounted and is driven by an under-water electric motor 32 which is preferably direct connected to it.

In this arrangement electric wires 33 are carried to the boat where a generator (not shown) or other source of electric power is located. With this arrangement an electric light 40 and a television camera (not shown) may be added to great advantage to attract the fish and to indicate when the net is full.

The hose 34 corresponds to the hose 26 but terminates in the cylinder 30 behind the propeller.

In order to prevent fish entering the cylinder 30 and being cut by the propeller, screens 35 and 36 are preferably located at the respective ends of the cylinder.

I now believe that a conical or frusto-conical net is preferable, but a cylindrical net or the like may be substituted.

Other modifications may be made without departing from the spirit of this invention, and only such limitations should be imposed as are included in the appended claims.

I claim:

1. A fish trap mechanism comprising a relatively long tubular net closed at the forward end and open at the back end, means for moving the net through the water closed end forward, means for creating an accelerated stream of water through the net from the closed forward end and outwardly from the open back end of the net in a direction opposite to the forward movement of the net, and means for supplying bait particles to the accelerated stream.

2. A fish trap mechanism comprising a conical-shaped net with rigid supports near the apex, means for moving the net through the water at the desired depth apex forward, means for creating an accelerated stream of water through the net from the apex and outwardly from the base of the net in a direction opposite to the forward movement of the net, means for supplying bait particles to the accelerated stream and means for closing the net and hauling it in.

3. A fish trap mechanism comprising a tubular shaped net closed at the forward end and open at the back end, having rigid supports near the forward end, a boat for moving the net through the water with the closed end forward at the desired depth, a jet for creating an accelerated stream of water through the net from the closed forward end and outwardly from the open back end of the net in a direction opposite to the forward movement of the boat, and means for forcing a stream of water containing bait particles in to the accelerated stream through the jet.

4. A fish trap mechanism comprising a conical-shaped net with rigid supports near the apex, a boat for moving the net through the water at the desired depth apex forward, a jet for creating an accelerated stream of water through the net from the apex and outwardly from the base of the net in a direction opposite to the forward movement of the boat, means for forcing a stream of water containing bait particles in to the accelerated stream through the jet, and means for hauling in the net by hoisting the outward end of the conical base first, whereby fish in the net are trapped.

5. A fish trap mechanism comprising a relatively long tubular net closed at its forward end and open at the back end, means for moving the net through the water with the closed end forward, means for creating an accelerated stream of water through the net from the forward end and outwardly from the back end of the net in a direction opposite to the forward movement of the net, a meat grinder and flow tank on the boat to supply bait particles to the tank, and means for forcing the water containing bait particles into the accelerated stream.

6. A fish trap mechanism comprising a tubular shaped net closed at the forward end and open at the back end and having rigid supports near the forward end, a boat for moving the net through the water closed end forward at the desired depth, a jet for creating an accelerated stream of water through the net from the closed forward end and outwardly from the open back end of the net in a direction opposite to the forward movement of the boat, a meat grinder and flow tank on the boat to supply bait particles to the tank and means for forcing the water containing bait particles into the accelerated stream through the jet.

7. A fish trap mechanism comprising a relatively long tubular net closed at one end, a boat for moving the net through the water in an endwise direction with the closed end forward, a rigid cylinder near the forward end of the net, a propeller mounted for operating in the cylinder, a motor for driving the propeller, a generator on the boat for supplying the power to drive the motor, a pump on the boat, and means for supplying bait particles to the cylinder behind the propeller whereby an accelerated stream of water containing bait particles moves from the closed forward end to the back open end of the net and out into the water.

8. A fish trap mechanism comprising a relatively long tubular net closed at one end, a boat for moving the net through the water in an endwise direction with the closed end forward, a rigid cylinder near the forward end of the net, a propeller mounted for operating in the cylinder, a motor for driving the propeller, a generator on the boat for supplying the power to drive the motor, a pump on the boat, means for supplying bait particles to the cylinder behind the propeller whereby an accelerated stream of water containing bait particles moves from the closed forward end to the open back end of the net and out into the water, and an electric light in the cylinder directing its light rays backwardly in the direction of the accelerated stream.

References Cited in the file of this patent

UNITED STATES PATENTS

| | | |
|---|---|---|
| 848,101 | Hale | Mar. 26, 1907 |
| 2,709,869 | Larson | June 7, 1955 |

FOREIGN PATENTS

| | | |
|---|---|---|
| 575,964 | France | May 2, 1924 |